June 22, 1965  C. W. SMITH ETAL  3,190,005
CABLE MEASURING MACHINE

Filed June 18, 1962  3 Sheets-Sheet 1

INVENTORS
CHARLES W. SMITH &
BY VICTOR I. KIMMEL

Robert S. Berger
ATTORNEY

INVENTORS
CHARLES W. SMITH &
VICTOR I. KIMMEL
BY
ATTORNEY

June 22, 1965  C. W. SMITH ETAL  3,190,005
CABLE MEASURING MACHINE
Filed June 18, 1962  3 Sheets-Sheet 3

INVENTORS
CHARLES W. SMITH &
VICTOR I. KIMMEL
BY
ATTORNEY

United States Patent Office 3,190,005
Patented June 22, 1965

3,190,005
CABLE MEASURING MACHINE
Charles W. Smith, Baltimore, and Victor I. Kimmel, Whitemarsh, Md., assignors to Martin-Marietta Corporation, Baltimore, Md., a corporation of Maryland
Filed June 18, 1962, Ser. No. 203,098
6 Claims. (Cl. 33—134)

This invention relates to a cable measuring machine and more particularly to such a machine which is capable of measuring lengths of cable to within an accuracy of ±.05 percent.

A recent investigation has indicated that the best commercially available cable measuring machines are only accurate to within approximately ±7 percent. This relatively poor capability is due to the principles of operation of these machines which inherently induce large errors into the cable measuring operation. Practically all of the commercially available machines employ a measuring wheel, which is either itself in direct contact with the cable being measured or which exerts pressure on the cable being measured indirectly through a belt disposed between the measuring wheel and the cable. In order to assure the proper amount of traction between either the measuring wheel and/or the belt and the cable, the measuring wheel must be subjected to a considerable amount of force which invariably causes the cable to become distorted or indented. As will be subsequently explained in more detail, whenever the cable is deformed during the cable measuring process, slippage must occur between the measuring wheel and the cable. In addition, under the aforementioned circumstances, any build-up of foreign matter on the measuring wheel or on the belt disposed between the measuring wheel and the cable will induce a variable error into the cable measuring process.

For these reasons cable measuring machines heretofore available are unsuitable for measuring cables when close tolerances must be maintained and, consequently, most manufacturers and fabricators of cables are presently resorting to manual means of measurement. This is obviously an expensive and time consuming operation which still will only consistently provide accuracies to within ±2 percent. In order to obtain greater accuracies by manual measurement, a system of rechecking must be employed. Experience has shown that it takes two men approximately one hour to manually measure 1000 feet of 2 inch diameter cable to an accuracy of ±2 percent. The significance of the present invention can be readily appreciated by the fact that this same 1000 feet of cable can be measured in approximately 12 minutes to an accuracy of ±.05 percent by one man using the cable measuring machine herein provided.

The principle object of the present invention therefore is to provide a cable measuring machine which eliminates or holds to an absolute minimum errors inherently associated with cable measuring machines heretofore devised. The cable measuring machine of the present invention will measure lengths of cable to an accuracy of within ±.05 percent. In addition this cable measuring machine is inexpensive to manufacture and will measure considerable lengths of cable in a minimum of time. Other objects and advantages of the present invention will become apparent as the following description is read in connection with the accompanying drawings in which:

Briefly stated, the cable measuring machine provided senses the linear motion of the cable on a linear section of an endless belt intermediate of the endless belt rollers thereby eliminating any errors due to the build-up of foreign matter on a measuring wheel or belt. In addition, errors associated with cable distortion or indentation are eliminated or held to an absolute minimum by distributing the force between the endless belt and the cable over a relatively large area.

Figure 1:
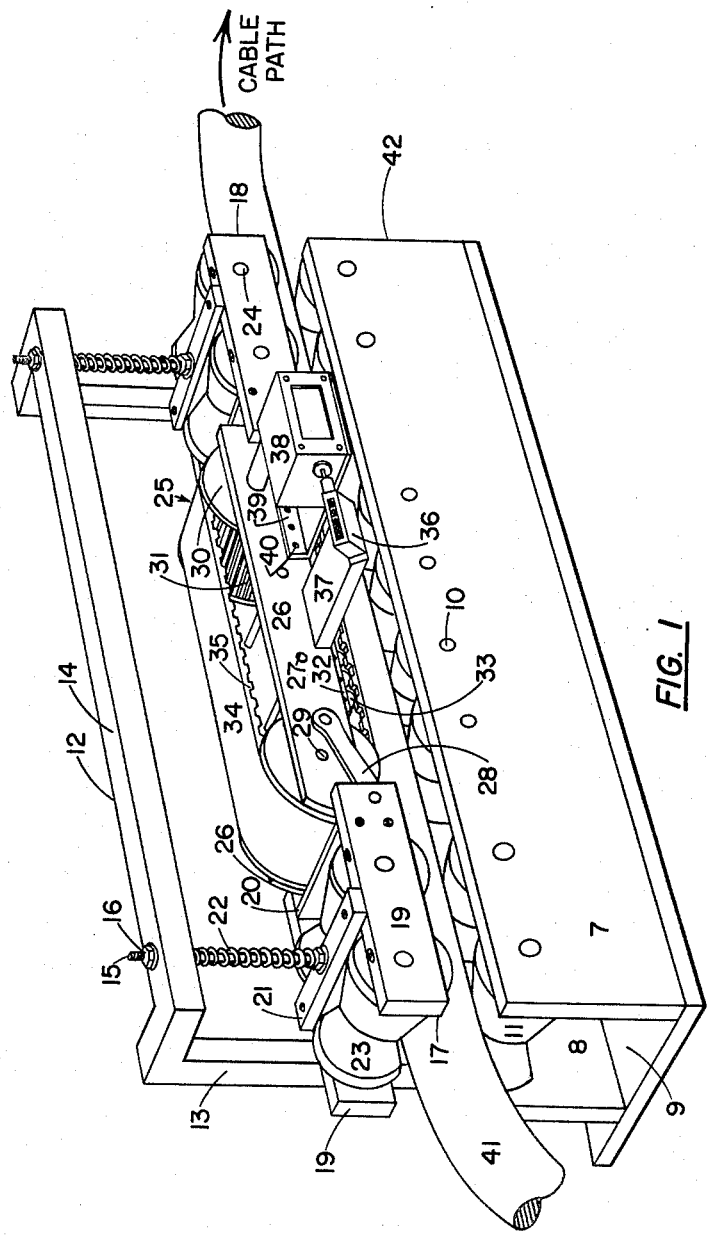
FIGURE 1 is a perspective view of the preferred embodiment of the present invention.

Referring first to FIGURE 1 in detail, a pair of parallel vertical plates 7 and 8 are mounted on a base 9. A plurality of parallel axle rods 10 are rigidly connected to and disposed between the vertical plates 7 and 8 and rotatably mounted on each of these axle rods is a V-grooved roller 11. A support frame 12, including a pair of vertical members 13 connected together by a U-shaped horizontal member 14, is mounted to the base 9. The base of the U-shaped horizontal member 14 of the support frame 12 is in parallel alignment with the vertical plates 7 and 8, being disposed directly over a point midway therebetween. A pair of vertical rods 15 are positioned in circular apertures suitably provided through the horizontal member 14 of the support frame 12, one end of each of these rods being threaded to receive a nut 16 which seats against the upper face of the horizontal member 14. A pair of roller carriages 17 and 18, each comprising two side plates 19 connected together by cross members 20 and 21, are supported from the vertical rods 15 by each having its cross member 21 fastened to the free end of one of the rods 15. Disposed around each of the vertical rods 15 is a coiled spring 22, which is restrained between the horizontal member 14 of the support frame 12 and the cross-members 21 of the roller carriages 17 and 18, respectively. It will be noted that the coiled springs 22 urge the roller carriages 17 and 18 toward the V-grooved rollers 11. A second pair of V-grooved rollers 23 are rotatably mounted to axle rods 24, which in turn are rigidly connected to and disposed between the two side plates 19 of each roller carriage 17 and 18. Preferably, each of the rollers 23 is located directly over one of the rollers 11.

A floating carriage 25, including a pair of side plates 26 securely connected together by a plurality of pins 27, is provided between the roller carriages 17 and 18 and connected to the roller carriage 17 by a pair of arms 28. One end of each arm 28 is pivotally connected to one side plate 26 of the floating carriage 25, while the other end of each arm 28 is pivotally connected to one side plate 19 of the roller carriage 17. It will be noted that under this arrangement the weight of the floating carriage 25 urges the floating carriage towards the V-grooved rollers 11. Journaled perpendicularly between the side plates 26 of the floating carriage 25 are a pair of shafts 29. A roller 30 is mounted on each shaft 29 and is keyed to its respective shaft so as to rotate therewith. These rollers 30 are provided with gear teeth 31 around their peripheries.

Figure 2:
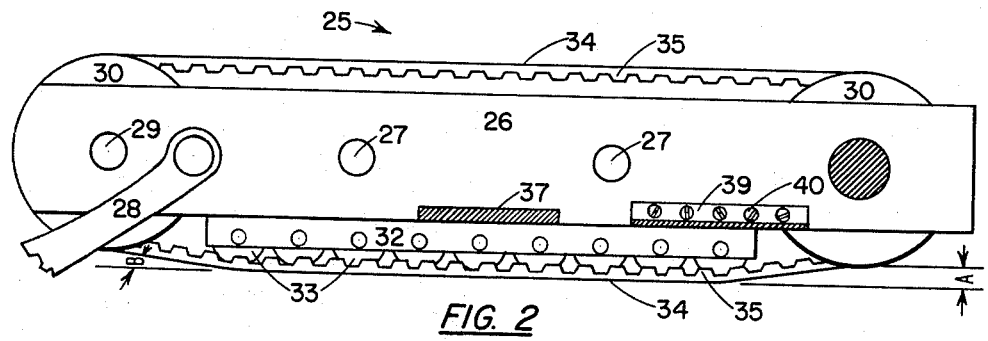
FIGURE 2 is a side elevation view of the floating carriage incorporated in the cable measuring machine illustrated in FIGURE 1.
Figure 3:
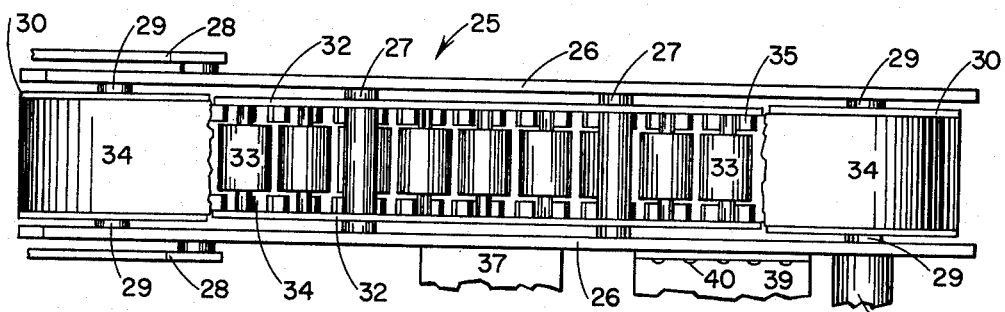
FIGURE 3 is a top plan view, partially cut away, of the floating carriage shown in FIGURE 1.

As may be better seen by reference to FIGURES 2 and 3, a pair of parallel support plates 32 are disposed between the two side plates 26 of the floating carriage 25, being connected to the pins 27. Rotatably mounted to and between the parallel support plates 32 so as to extend below the lower edges thereof and below the rollers 30 is a plurality of relatively small diameter rollers 33. Disposed on the rollers 30 and 33 is a flat flexible steel corded endless gear belt 34. The teeth 35 of the endless gear belt 34 are designed to engage the gear teeth 31 of the rollers 30 in order that there can be no slippage between the endless gear belt and these rollers. These teeth 35 of the endless gear belt 34 are provided only in the vicinity of the two longitudinal edges thereof so that they will not come into contact with the rollers 33, the rollers being shorter in length than the width of the belt.

As illustrated in FIGURE 1, a counter 36 is mounted on a plate 37, which in turn is connected to one of the side plates 26 of the floating carriage 25. Interconnected between one of the shafts 29 of the floating carriage 25 and the counter 36 is an infinite ratio speed reducer 38. This infinite ratio speed reducer 38 is supported on a bracket 39 which is connected to one of the side plates 26 of the floating carriage 25 by a plurality of screws 40. Thus, provision is made whereby rotational motion of the rollers 30 is converted into linear measurement by the infinite ratio speed reducer 38, linear measurement being recorded on the counter 36.

In operation, an operator inserts a cable 41 to be measured into the cable measuring machine between the V-grooved rollers 23 of the roller carriage 17 and the V-grooved rollers 11 disposed immediately therebelow against the force exerted on the roller carriage 17 by its associated coiled spring 22. The operator then pushes the cable 41 through the machine under the steel corded endless gear belt 34 and under the V-grooved rollers 23 of the roller carriage 18 to a point where the end of the cable is directly over the edge 42 of the vertical plate 7. The counter 36 is adjusted to a zero reading and the cable 41 drawn through the machine to a point where the counter records the desired length of cable. The weight of the floating carriage 25 creates a sufficient frictional force between the endless belt 34 and the cable 41 to prevent any slippage therebetween. The cable is then marked and cut at a point thereon which is disposed directly over the edge 42 of the vertical plate 7. Any suitable means may be employed to draw the cable 41 through the machine. Excellent results have been obtained using a motor driven reel, which draws the cable through the machine at a rate of 80 feet per minute and upon which the cable is coiled as it is being measured. It will be noted that the V-grooved rollers 11 and 23 straighten the cable 41 as it passes through the machine and serve to center the cable under the steel corded endless gear belt 34. The fact that the roller carriages 17 and 18 are slideably mounted to the horizontal member 14 of the support frame 12 permits the same machine to be used in measuring cables of different diameters.

A typical machine built in accordance with the principles of this invention weighs approximately 100 pounds. The floating carriage of this machine weighs 8 pounds, affording sufficient traction between its endless belt and the cables being measured to assure that no slippage will occur therebetween. The gear toothed rollers carrying the endless gear belt are 3.84 inches in diameter, each weighing approximately one pound. A total of nine 3/4 inch diameter rollers disposed on 7/8 inch centers are employed to support the endless belt against the cable being measured. The belt is 3/32 inch in thickness and is displaced a distance of A=1/4 inch (see FIGURE 2) below the gear toothed rollers. This machine consistently measures cables varying in size from 3/4 to 2 1/2 inches in diameter to within an accuracy of ±.05 percent at a rate of eighty feet per minute.

As previously indicated there are several different types of errors inherently associated with conventional types of cable measuring machines. The first type of error is caused by foreign matter building up on the measuring wheel or on the belt disposed between the measuring wheel and the cable being measured. This build-up of foreign matter in effect changes the radius of the measuring wheel and introduces a variable error into the measuring operation. This type of error has been eliminated in the cable measuring machine herein provided by displacing that portion of the endless belt which contacts the cable a distance of A (see FIGURE 2) below the rollers 30. This arrangement results in the linear motion of the cable 41 being translated into linear motion of the belt 34. Linear motion of the belt 34 is then transformed into rotational motion of a roller 30 which is sensed by the infinite ratio speed reducer 38 and converted into linear measurement.

A second type of error associated with conventional cable measuring machines is that which shall be referred to as the "frictional slippage" which occurs between the measuring wheel and the cable being measured. Frictional slippage is experienced when the forces due to friction in the wheel bearing and the rotational inertial characteristic of the wheel exceed the force generated at the rim of the wheel as represented by a product of the coefficient of friction and the normal weight of the wheel. This type of slippage is a direct function of the inertia of the measuring wheel. By employing relatively small and light weight gear toothed rollers 30 in the cable measuring machine of the present invention, the inertial force is held to an absolute minimum and frictional slippage thereby eliminated.

Figure 4:
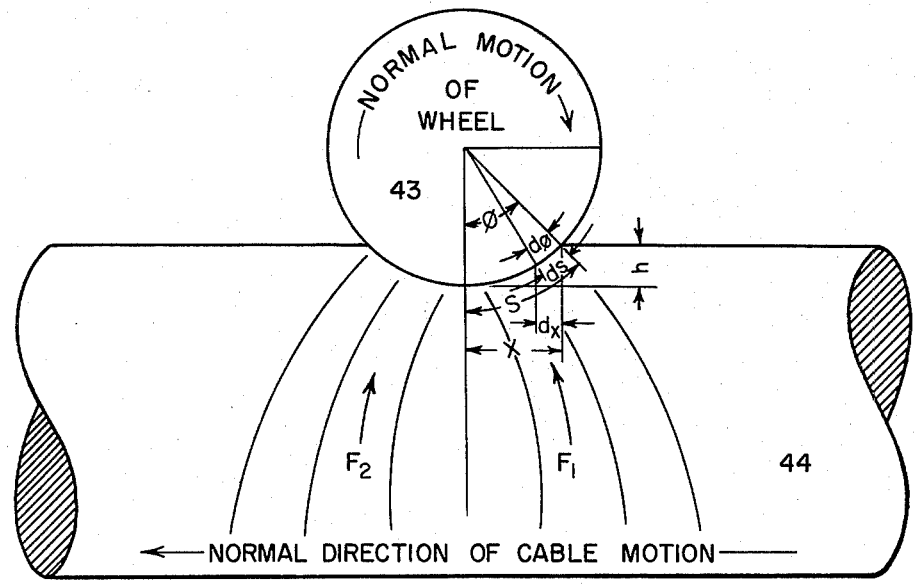
FIGURE 4 is a diagram illustrative of the types of error encountered when a measuring wheel is indented into the surface of a cable being measured.

Whenever the cable is distorted or indented by the measurement sensing means of a cable measuring machine, a variable error which shall be referred to as "internal slippage" must occur between the cable and the measurement sensing means. A better understanding of internal slippage may be had by reference to FIGURE 4, wherein a wheel 43 is indented into a cable 44 a distance of $h$. It will be noted that, when the cable 44 is drawn under the wheel 43 an incremental distance $dx$, a point on the periphery of the wheel will rotate through an incremental angle of $d\phi$ and travel an incremental distance of $ds$. It will further be noted that the incremental distance $ds$ is greater than the incremental distance $dx$. Stated differently, when the cable 44 is drawn a distance of X under the wheel 43, a point on the periphery of the wheel 43 must travel a distance of S and, since the distance S is greater than the distance X, internal slippage must occur between the wheel and the cable. The difference between the distance S and the distance X is dependent upon the depth of indentation $h$ of the wheel 43 into the cable 44. The direction of the slippage is determined by the type of material from which the cable insulation is formed. When the cable insulation is formed of a relatively soft material (one having a high coefficient of friction), the error will be introduced into the wheel 43 in the same direction as the normal motion of the wheel. However, if the cable insulation is formed of a relatively hard material (one having a low coefficient of friction), the error will be introduced into the wheel 43 in a direction counter to the normal motion of the wheel.

Referring again to FIGURE 4, the forces, which are exerted against the wheel 43 by the cable 44 on either side of a plane normal to the longitudinal axis of the cable and passing through the axis of rotation of the wheel 43, have been represented by $F_1$ and $F_2$. It will be noted that the portion of insulation of the cable 44 that is in contact with the wheel 43 is stretched and, further, that the forces $F_1$ and $F_2$ are directly proportional to the internal stresses thereby created in the cable insulation. Theoretically, if the internal stresses due to stretching were identical on either side of the aforementioned perpendicular plane, $F_1$ would be equal to $F_2$. However, due to the relative inelasticity of the types of material (usually rubber) from which cable insulation is made, the internal stresses in the cable insulation on either side of this perpendicular plane are not equal and, consequently, $F_1$ will always be greater than $F_2$. This situation will cause internal slippage between the wheel 43 and the cable 44 and introduce an error into the wheel 43 in the same direction as the normal motion of the wheel. The difference between $F_1$ and $F_2$ is directly proportional to the depth of indentation of the wheel 43 into the cable 44, i.e., the distance $h$.

Figure 5:
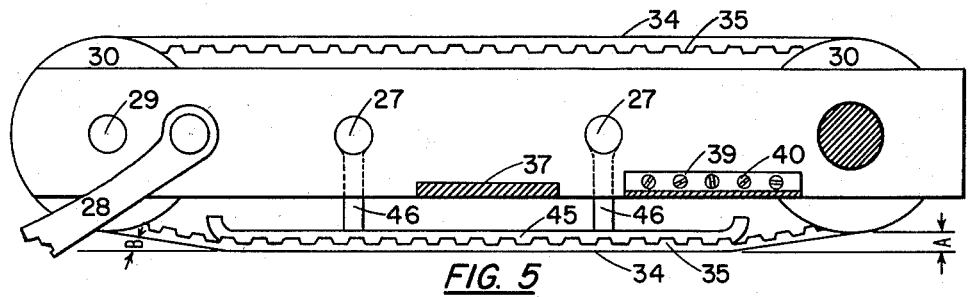
FIGURE 5 is a side elevation of an alternate form of floating carriage which may be utilized in accordance with the principles of the present invention.
Figure 6:
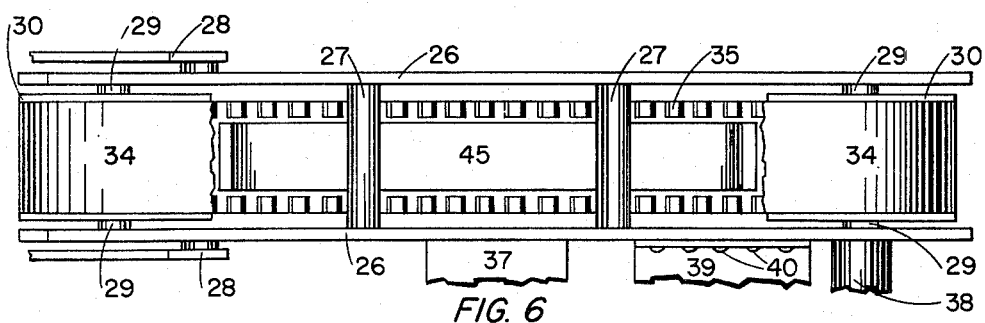
FIGURE 6 is a top plan view of the floating carriage illustrated in FIGURE 5.

Since internal slippage is a function of the depth to which the cable is indented by the measurement sensing means, the cable measuring machine of the present invention has been devised to keep this indentation or distortion of the cable at a minimum. This is accomplished by distributing the force between the endless gear belt 34 and the cable 41 over as large an area as practical. Referring to FIGURE 2 it will be seen that the desired result has been obtained by employing a plurality of rollers 33. Indentation of the cable is at an absolute minimum when the alternate form of this invention illustrated in FIGURES 5 and 6 is utilized. The floating carriage therein shown is similar to that illustrated in FIGURES 1, 2 and 3 except that the pair of parallel support plates 32 and the plurality of relatively small diameter rollers 33 have been removed and replaced with a sliding block 45 which acts against the inside surface of the steel corded endless gear belt 34. The sliding block 45 is supported from the pins 27 by struts 46. While this configuration may be better suited for specific applications, as a practical matter the best over-all results will usually be obtained by employing the floating carriage illustrated in FIGURES 1, 2 and 3. It has been found that the type of floating carriage therein illustrated, when used with a steel corded endless gear belt 34, reduces the amount of indentation of the cable being measured to an inconsequential figure and at the same time develops far less frictional forces between the rollers 33 and the endless gear belt 34 than is developed between the sliding block 45 and the endless gear belt 34, other factors being the same.

As previously indicated the cable measuring machine herein provided either eliminates or reduces to an absolute minimum those errors inherently associated with conventional types of cable measuring devices. As a practical matter all variable type errors are completely eliminated. Inasmuch as the endless gear belt 34 is displaced a distance of A (see FIGURES 2 and 5) below the gear toothed rollers 30 in the present machine causing the endless belt 34 to become distorted a limited amount at the point where it initially makes contact with the cable 41, a slight error will be introduced into the measuring process. This error is a function of the angle B and the thickness of the endless belt 34 and can consequently be reduced to a minimum by keeping the angle B at a minimum and by using a relatively thin endless belt. In addition, it will be noted that this is a constant type of error and can be readily compensated by the proper adjustment of the infinite ratio speed reducer 38.

This invention may be embodied in other ways without departing from the spirit and essential characteristics thereof. The embodiments of the invention described herein are therefore to be considered as in all respects illustrative and not restrictive, the scope of the invention being indicated by the appended claims, and all changes which come within the meaning and range of equivalency of the claims are intended to be embraced therein.

What is claimed is:
1. In a cable measuring machine cooperating with an external means for propelling a cable to be measured therethrough, an improvement comprising:
  (a) a base;
  (b) roller means connected to said base in parallel alignment to support said cable thereon;
  (c) a floating carriage having a pair of rollers thereon, said carriage also including an endless belt disposed on said pair of rollers in a manner preventing any slippage from occurring therebetween, said carriage being connected to said base so that said cable may be disposed between said belt and said roller means with sufficient traction therebetween to reduce slippage therebetween to a minimum as said cable is propelled through said machine;
  (d) a second means acting against the inside of said belt to urge a substantial section of said belt between said pair of rollers into contact with said cable, said section of said belt being displaced by said second means a greater distance from a plane passing through the axes of rotation of said pair of rollers than a section of said belt passing over one of said pair of rollers is displaced from the axis of rotation of said one of said pair of rollers; and
  (e) means for measuring the distance traveled by said belt as said cable passes through said machine causing said belt to rotate on said pair of rollers.

2. The apparatus of claim 1 wherein said second means comprises a plurality of rollers having their axes of rotation parallel to the axes of rotation of said pair of rollers.

3. The apparatus of claim 1 wherein said second means comprises a sliding block.

4. A cable measuring machine comprising:
  (a) a base;
  (b) roller means connected to said base in parallel alignment to support a cable thereon;
  (c) a floating carriage having a pair of rollers thereon, said carriage also including an endless belt disposed on said pair of rollers in a manner preventing any slippage from occurring therebetween, said carriage being connected to said base so that said cable may be disposed between said belt and said roller means with sufficient traction therebetween to reduce slippage therebetween to a minimum as said cable is propelled through said machine;
  (d) a second means acting against the inside of said belt to urge a substantial section of said belt between said pair of rollers into contact with said cable, said section of said belt being displaced by said second means a greater distance from a plane passing through the axes of rotation of said pair of rollers than a section of said belt passing over one of said pair of rollers is displaced from the axis of rotation of said one of said pair of rollers;
  (e) a third means for guiding said cable under said endless belt as said cable is propelled through said machine; and
  (f) a counter mechanism connected to one of said pair of rollers to convert the rotational motion of said one of said rollers into linear measurement of said cable.

5. The apparatus of claim 4 wherein said second means comprises a sliding block.

6. In a cable measuring machine cooperating with an external means for propelling a cable to be measured therethrough, an improvement comprising:
  (a) a pair of rollers having an endless belt disposed thereon so as to rotate therewith in a manner preventing any slippage from occurring therebetween;
  (b) a first means acting against the inside of said belt to urge a substantial section of said belt between said pair of rollers into contact with said cable, said section of said belt being displaced by said first means a greater distance from a plane passing through the axes of rotation of said pair of rollers than a section of said belt passing over one of said pair of rollers is displaced from the axis of rotation of said one of said pair of rollers;
  (c) a second means for creating sufficient traction between said section of said belt and said cable to reduce slippage therebetween to a minimum as said cable is propelled through said machine; and
  (d) means for measuring the distance traveled by said belt as said cable passes through said machine causing said belt to rotate on said pair of rollers.

(References on following page)

References Cited by the Examiner

UNITED STATES PATENTS

| | | | |
|---|---|---|---|
| 1,484,036 | 2/24 | Mason | 33—134 |
| 1,614,605 | 1/27 | Egert | 33—134 |
| 1,759,992 | 5/30 | McCarthy | 33—129 |
| 1,843,104 | 2/32 | Blashill | 226—171 |
| 1,999,151 | 4/35 | Finley | 226—172 |
| 2,401,576 | 4/46 | Mason | 33—134 |
| 2,709,000 | 5/55 | Frank | 226—172 |
| 2,739,387 | 3/56 | Scheidt | 33—134 |
| 2,844,876 | 7/58 | Van Hook | 33—134 |
| 2,983,417 | 5/61 | Swanson | 226—172 |

FOREIGN PATENTS

| | | |
|---|---|---|
| 1,115,954 | 10/54 | France. |
| 1,231,210 | 9/60 | France. |
| 5,206 | 6/01 | Great Britain. |

ISAAC LISANN, *Primary Examiner.*